July 30, 1968 — G. MATTE — 3,394,961
COLLAPSIBLE CAMPER

Filed June 7, 1966 — 2 Sheets-Sheet 1

INVENTOR
GÉDÉON MATTE
BY Smart & Biggar
ATTORNEYS.

July 30, 1968 — G. MATTE — 3,394,961
COLLAPSIBLE CAMPER

Filed June 7, 1966 — 2 Sheets-Sheet 2

INVENTOR
GÉDÉON MATTE
BY Smart & Biggar
ATTORNEYS.

United States Patent Office 3,394,961
Patented July 30, 1968

3,394,961
COLLAPSIBLE CAMPER
Gédéon Matte, 226 Dupont St., Pont-Rouge,
Quebec, Canada
Filed June 7, 1966, Ser. No. 555,844
6 Claims. (Cl. 296—27)

ABSTRACT OF THE DISCLOSURE

A collapsible trailer about the size and configuration of "tent trailers" with all wall and roof sections made of rigid and, if desired, heat and sound insulated panels. The panels are hingedly interconnected in a particular manner whereby they can be folded and placed into a boxlike frame forming a light and compact arrangement for transportation.

---

This invention relates to collapsible structures adapted to be readily folded into a compact arrangement or extended such as to provide inhabitable space that can be used for camping purposes or the like.

Mobile inhabitable enclosures may be classified into three groups of structures: (a) fixed-frame trailers, (b) tents, and (c) combinations of fixed frames and collapsible wall and roof forming means. Campers of the latter type, hereinafter referred to as collapsible campers, are gaining rapidly in popularity mainly because they combine advantages of both the fixed-frame trailers and tents. They are relatively light and less costly than most conventional fixed-frame trailers and provide better comfort and security to the occupants than ordinary tents.

Conventional collapsible campers in general comprise a base, or frame, on which a wall and roof forming tent is mounted; the test being made of canvas supported on a knock-down support structure. United States Patent No. 1,917,234 shows a different arrangement in which the upper portion consists of rigid panels, and a still further design is illustrated in United States Patent No. 2,640,721 where rigid panels and canvas sections are combined to form walls and a roof.

Collapsible campers comprised mainly of canvas sections are, in general, lighter than the others mentioned above but provide less protection to their occupants and are more liable to damage from tearing, and mildew. Moreover they are not always sufficiently impervious to winds and rain and can only provide limited insulation against cold and noise. On the other hand structures consisting of rigid panels in general can only allow a floor space which is limited in size to the dimensions of the base which, in turn, must be relatively narrow not to become cumbersome on roads.

It is therefore an object of the present invention to provide a relatively light collapsible camper made of rigid panels, which is simple to manufacture and in which the flooor space is not limited to the size of the base.

I have found that most inconveniences associated with prior art collapsible campers can be eliminated by the provision, on a base, of (a) a knock-down support element adapted on erection to project upwardly at each end of said base and having at least one winglike portion adapted to extend laterally beyond one of the sides of the base; and (b) at least one set of articulated panels hingedly connected together and to one side of the base. The articulated panels when extended, transversely span the support elements and are disposed contiguously so as to form a roof and wall-like structure having a profile conforming to the outer contour of the support elements.

The arrangement set forth above is relatively simple to build and may be made of light materials as will become more apparent from the following description. It is particularly advantageous, in that its floor space is no longer limited to the dimensions of its base due to the fact that the roof panels rest on the support elements which may be of different shapes and sizes and which extend outwardly beyond the sides of the base.

Preferably the base is mounted on wheels and each support element includes two winglike portions, one at each side of the base. Thus each support element consists of a central portion and two winglike portions which may be hinged to the vertical edges of the central portion. It is also preferable to use some of the roof panels to form, when collapsed, a cover for the base.

In drawings which illustrate an embodiment of the invention,

Figure 1:
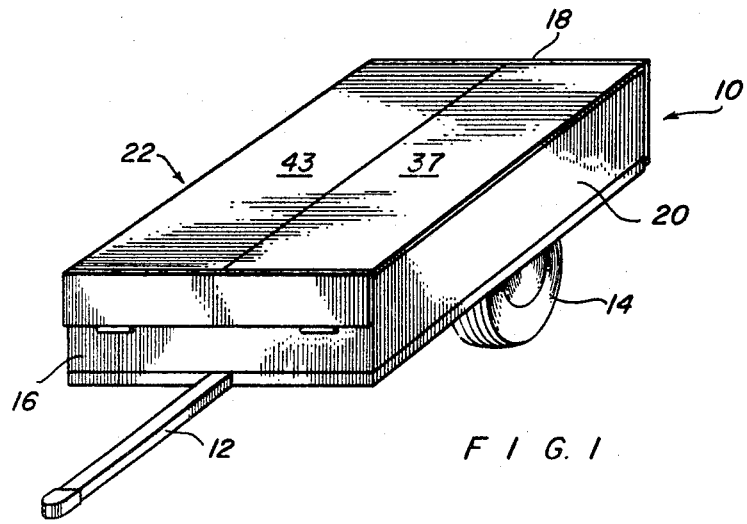
FIGURE 1 is an isometric view of a camper in the collapsed position.

The illustrated embodiment comprises a base, represented by reference numeral 10, a draw bar 12 and a set of wheels 14. The base 10 has two ends 16, 18 and two sides 20 and 22.

Figure 2:
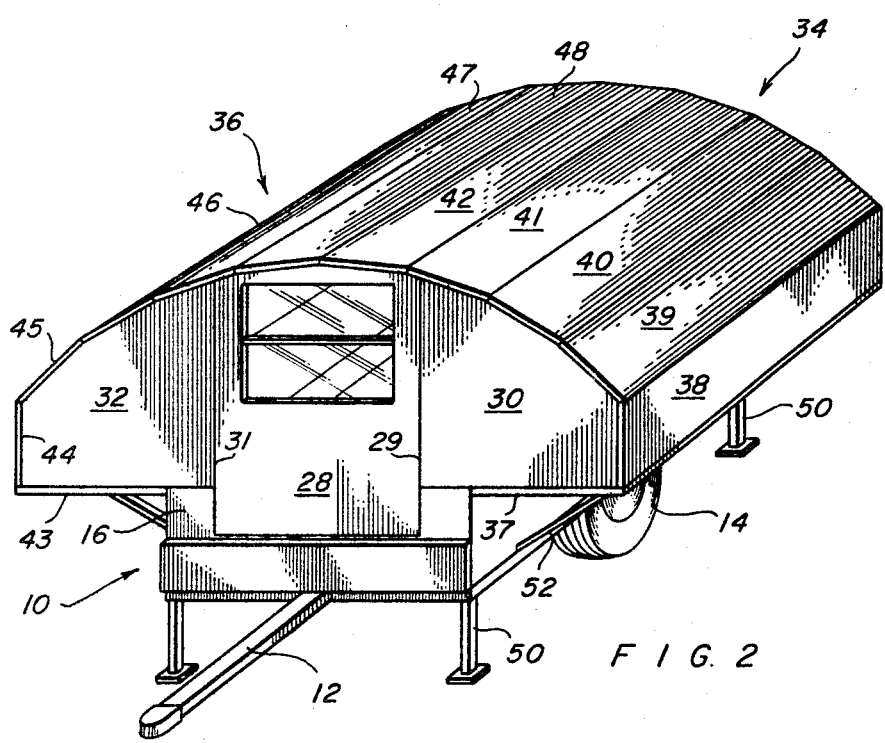
FIGURE 2 is an isometric view of the same camper in the fully extended position.

In the fully erected position, as shown in FIGURE 2, a knock-down support element 24 projects at the end 16 of the base 10, to which it is hingedly connected so as to be foldable toward the inside of the base. A corresponding knock-down support element 26 (not shown, see FIGURES 3, 4) is hingedly connected to the opposite end 18 of the base. Each support element comprises a central portion 28 and two winglike portions 30, 32 articulated to the opposite vertical edges 29, 31 of the central portion 28. The structure illustrated also comprises two sets 34 and 36 of articulated panels 37 through 42 and 43 through 48 respectively that can be folded and stored for transport within the base 10 as seen in FIGURE 1. These sets of panels when extended as in FIGURE 2 transversely span the support elements 24, 26 and are disposed contiguously so as to form a roof and wall-like structure having a profile conforming to the outer contour of the support elements 24, 26. Hence at the right-hand side of the base 10 there is provided a substantially horizontal outwardly extending section comprising panel 37, an upwardly extending wall section comprising vertical panel 38, and a roof section formed by panels 39 through 42. Panels 43 through 48 form complementary wall and roof sections at the left-hand side of the base. Each set of panels is hingedly connected to one side 20 or 22 of the base 10 and panels 42 and 48 when extended abut each other along their edges at the top of the support elements 24, 26, and any appropriate known locking means (not shown) may be used to connect together the panels 42 and 48.

Figure 3:
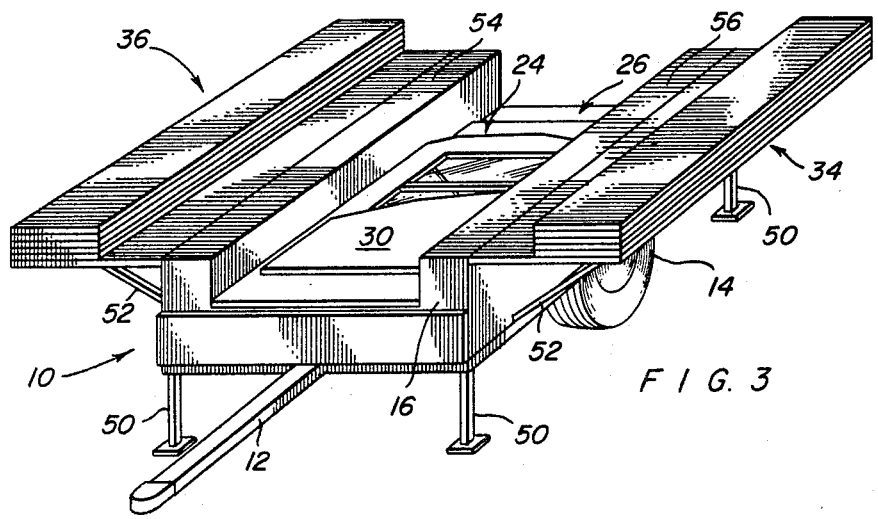
FIGURES 3 and 4 are isometric views illustrating the same camper in two intermediate stages in the erection.
Figure 4:
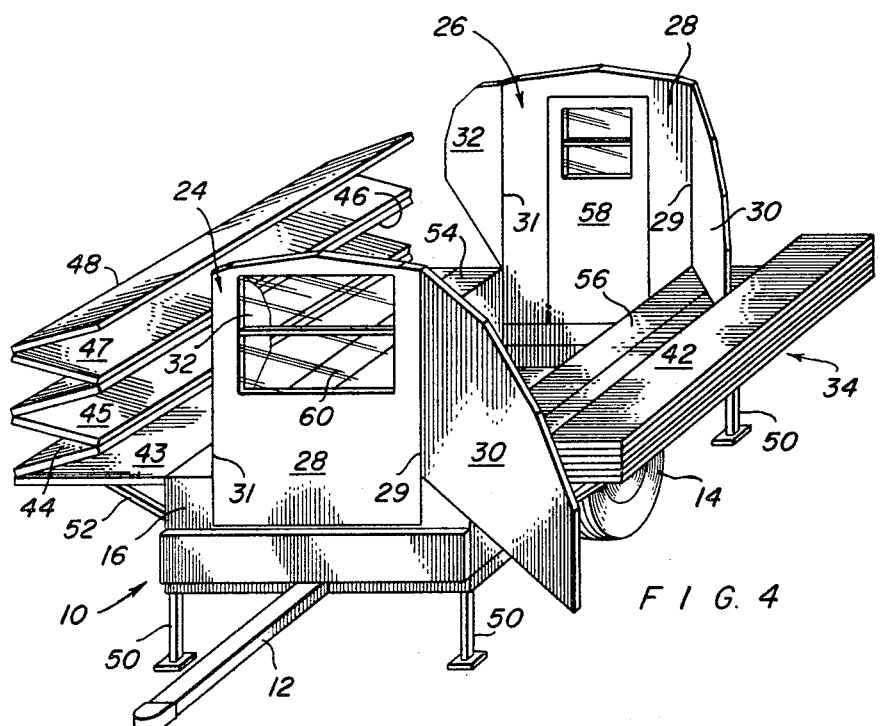

The procedure for erecting the arrangement of FIGURE 1 to attain the position illustrated in FIGURE 2 comprises the steps of:

(1) Anchoring the base 10 by means of legs 50 (FIGURE 3) provided at each corner of the base;

(2) Pivoting panels 37 and 43 about their respective hinge axis while maintaining the other panels 38 to 42 and 44 to 48 in their closed position, and locking panels 37 and 43 in the outwardly projecting horizontal position, by means of structs 52 (FIGURE 3);

(3) Raising support elements 24, 26 into vertical position and at least partly unfolding winglike portions 30, 32;

(4) Extending the sets of panels 34 and 36 around the contour of support elements 24 and 26 and completing the unfolding of wing portions 30, 32; and (5) Securing at least some of panels 37 to 48 to the support elements 24, 26 by means of any appropriate known fasteners (not shown) to give the structure more rigidity.

The illustrated embodiment further comprises two storage compartments 54, 56 along the sides of the base 10. The tops of compartments 54, 56 may, if desired, be used as a pair of inwardly facing seats. The horizontal surfaces provided by panels 37 and 48 are preferably made flush with the tops of compartments 54, 56 so as to provide wider sleeping compartments.

As shown in FIGURE 3 the support element 26 includes a door 58 whereas a window 60 is provided in the central portion of support element 24.

The internal structure for the panels 37 to 48 and support elements 24, 26 may be varied depending upon considerations such as cost, weight insulation desired, materials available etc. But satisfactory results were achieved with the panels each consisting of a wooden frame covered by an inner thin sheet of rigid material e.g. plastic, and an outer sheet of aluminium. With this arrangement it is posisble to place a thickness of insulation between both sheets. If necessary the panels may be made more water-resistant by applying a protective coating on the inner face of one of the sheets during assembly.

To ensure that a camper in accordance with the present invention is sufficiently impervious to water the edges of the articulated panels 37 to 48 may be formed as cooperating grooves and tongues or may be lined with seal members of flexible materials such as rubber.

The embodiments hereinbefore described may be modified in various manners to suit the needs of the users. In particular it may be sufficient to provide only one winglike portion per support element; the articulated panels could be made as a single set thereof hinged or detachably connected to the base; the contour of the support elements could be simplified such as to require a lesser number of articulated panels or to take the shape of a tent. It is also possible to dispose the axis of the wheels in the direction of the length of the articulated panels so that the sides 20, 22 become the ends of the base; or alternatively any suitable transport means may be substituted for wheels 14.

What I claim as my invention is:

1. A collapsible structure comprising: a base; a pair of knock-down support elements each being hingedly connected at its lower end to a different one of the ends of said base and adapted on erection to project upwardly at said end of said base and having at least one winglike portion adapted to extend laterally beyond one of the sides of said base; and at least one set of articulated panels pivotally connected together and at one side of said base; said articulated panels, when extended, being supported by and transversely spanning said support elements and being disposed contiguously whereby to form a roof and wall-like structure conforming to the outer contour of said support elements, wherein some of said articulated panels adjacent the winglike portions of said support elements form: (1) a substantially horizontal outwardly extending section pivotally connected along its inner edge to said base, (2) an upwardly extending wall section pivotally connected along its lower edge to the outer edge of said outwardly extending section, and (3) a roof section longitudinally pivotally connected to the upper edge of said upwardly extending section.

2. A collapsible camper as defined in claim 1, wherein said articulated panels and said support elements are thermally insulated and are covered at least on the outer side thereof with a sheet of aluminium.

3. A collapsible structure as defined in claim 1 comprising two sets of articulated panels and wherein each support element has a winglike portion at each side of said base, said articulated panels forming at each side of said base (1) a substantially horizontal outwardly extending section hinged along its inner edge to said base, (2) a wall section, and (3) a roof section; said roof sections abutting each other.

4. A collapsible structure as defined in claim 3 wherein each support element comprises a central portion having two vertical edges to which said winglike portions are foldably hinged.

5. A collapsible structure as defined in claim 4 wherein each set of articulated panels is provided with hinges allowing folding thereof into compact arrangement for facilitating transport of said collapsible structure.

6. A collapsible structure as defined in claim 5 wherein said base is a generally rectangular casing opened at the top and adapted to receive substantially wholly therewithin said support elements and both sets of articulated panels when collapsed.

References Cited

UNITED STATES PATENTS

| 2,670,986 | 3/1954 | Presnell | 296—23.7 |
| 2,765,499 | 10/1956 | Couse | 52—66 |
| 3,175,520 | 3/1965 | Talmey | 296—28.2 X |

FOREIGN PATENTS

| 103,814 | 4/1938 | Australia. |
| 504,573 | 7/1954 | Canada. |

PHILIP GOODMAN, *Primary Examiner.*